(12) United States Patent
Knapp et al.

(10) Patent No.: US 7,352,187 B2
(45) Date of Patent: Apr. 1, 2008

(54) VACUUM MEASURING GAUGE

(75) Inventors: Wolfram Knapp, Moser (DE); Martin Wuest, Malans (CH)

(73) Assignee: Inficon GmbH, Bad Ragaz (CH)

( * ) Notice: Subject to any disclaimer, the term of this patent is extended or adjusted under 35 U.S.C. 154(b) by 30 days.

(21) Appl. No.: 11/389,007

(22) Filed: Mar. 27, 2006

(65) Prior Publication Data
US 2006/0202701 A1    Sep. 14, 2006

Related U.S. Application Data

(63) Continuation-in-part of application No. 11/075,703, filed on Mar. 10, 2005, now abandoned.

(30) Foreign Application Priority Data
Mar. 4, 2005    (EP) ................... 05004855

(51) Int. Cl.
*G01L 21/30*    (2006.01)
*G01N 27/62*    (2006.01)
(52) U.S. Cl. ...................... 324/460; 324/464
(58) Field of Classification Search ................ 324/460, 324/464
See application file for complete search history.

(56) References Cited

U.S. PATENT DOCUMENTS

| 3,343,781 A | 9/1967 | Phillips et al. |
| 3,510,712 A | 5/1970 | Rabinowitz et al. |
| 3,604,970 A | 9/1971 | Culbertson et al. |
| 3,743,876 A | 7/1973 | Redhead |
| 4,051,376 A | 9/1977 | Lorch et al. |
| 4,272,699 A | 6/1981 | Faubel et al. |
| 4,975,656 A | 12/1990 | Schaeffer et al. |
| 5,128,617 A | 7/1992 | Bills |

(Continued)

FOREIGN PATENT DOCUMENTS

EP    0 516 422    12/1992

(Continued)

*Primary Examiner*—Andrew H. Hirshfeld
*Assistant Examiner*—Jeff Natalini
(74) *Attorney, Agent, or Firm*—Oliff & Berridge, PLC

(57) ABSTRACT

An electron-emitting cathode consists of an electrically conducting emitter layer attached to a side wall which consists of stainless steel and a gate which is fixed at a mall distance inside a concave emitter surface of the emitter layer. The cathode surrounds a reaction area containing a cylindrical grid-like anode and a central ion collector which consists of a straight axial filament. An ion collector current reflecting the density of the gas in the reaction region is measured by a current meter while a gate voltage is kept between the ground voltage of the emitter layer and a higher anode voltage and is regulated in such a way that an anode current is kept constant. The emitter layer may consists of carbon nanotubes, diamond-like carbon, a metal or a mixture of metals or a semiconductor material, e.g., silicon which may be coated, e.g., with carbide or molybdenum. The emitter surface can, however, also be a portion of the inside surface of the side wall roughened by, e.g., chemical etching. The gate may be a grid or it may be made up of patches of metal film covering spacers distributed over the emitter area or a metal film covering an electron permeable layer placed on the emitter surface.

23 Claims, 3 Drawing Sheets

U.S. PATENT DOCUMENTS

| | | |
|---|---|---|
| 5,198,772 A | 3/1993 | Peacock et al. |
| 5,278,510 A | 1/1994 | Baptist et al. |
| 5,422,573 A | 6/1995 | Bills et al. |
| 5,602,441 A | 2/1997 | Ohsako et al. |
| 6,046,456 A | 4/2000 | Bills |
| 6,257,069 B1 | 7/2001 | Brady et al. |
| 7,030,620 B2 * | 4/2006 | Correale .................... 324/460 |
| 2001/0011890 A1 | 8/2001 | Kawasaki |
| 2003/0128647 A1 * | 7/2003 | Birecki et al. ............. 369/101 |
| 2004/0145297 A1 * | 7/2004 | Nakashima et al. ........ 313/495 |
| 2005/0030044 A1 | 2/2005 | Correale |

FOREIGN PATENT DOCUMENTS

| | | |
|---|---|---|
| EP | 0 622 621 | 11/1994 |
| EP | 0 662 607 | 7/1995 |
| GB | 227 858 | 7/1925 |
| GB | 771 799 | 4/1957 |
| GB | 882 781 | 11/1961 |
| GB | 978 775 | 12/1964 |
| GB | 1 148 440 | 4/1969 |
| GB | 1 535 314 | 12/1978 |

* cited by examiner

VACUUM MEASURING GAUGE

This is a Continuation-in-Part of application Ser. No. 11/075,703 filed Mar. 10, 2005 which is hereby incorporated by reference herein in its entirety.

FIELD OF THE INVENTION

The invention relates to a vacuum measuring gauge for high vacuum applications.

PRIOR ART

Vacuum measuring gauges of the Bayard-Alpert type are well known. Usually a hot cathode is used as an electron source. This has many disadvantages. A hot cathode which usually takes the shape of a filament needs to be heated by an electric current which requires a feed circuit capable of constantly supplying a relatively high feed voltage. The cathode emits electromagnetic radiation which may influence measurement results in not precisely predictable ways and may lead to undesirable interference with other measurements. A hot cathode also tends to release adsorbed gas molecules and to chemically react with gases when heated which again may influence measurement results. It is usually sensitive to vibrations which are often unavoidable in industrial processes. This may again lead to a deterioration of measuring accuracy and over time even to the destruction of the cathode. The kinetic energies of the emitted electrons are distributed over a relatively wide interval which reduces efficiency and may also lead to fluctuations of the sensitivity of the gauge.

U.S. Pat. No. 5,278,510 A shows a Bayard-Alpert vacuum measuring gauge of the generic type with a field emission cathode where, in an essentially cylindrical housing, an ion collector in the shape of an axial wire is arranged, surrounded by a cylindrical grid-like anode. Between the anode and the housing the electron-emitting field emission cathode facing the anode and the ion collector is arranged. Cathodes of this type offer considerable advantages. They are mechanically robust solid state elements which do not produce heat and function within a large temperature range. They do not as a rule cause side effects which might impact on measurement results in ways which are difficult to assess and compensate for.

In the vacuum measuring gauge as described in the above-mentioned patent publication the field emission cathode is a Spindt type cathode with isolated micropoints shaped as a square plate with a planar emitter area. Due to this planar configuration the emitter area can only be relatively small. Also, it covers only a small solid angle as seen from inside the anode, in particular from the position of the ion collector.

For high accuracy, in particular at very low pressure, a high ionization rate is required. This can only be achieved by a large electron density that must be created by extracting electrons at a high rate from the small emitter area which implies a high electron flow density there which in turn requires a high quality emitter surface as well as elevated electrical field strengths. The latter requirement may cause considerable strain on the material resulting in wear, e.g., due to sputtering, thereby reducing the service life of the gauge. Also, the need to provide high voltage differences places more stringent design requirements on the control circuit.

SUMMARY OF THE INVENTION

It is the object of the invention to provide a vacuum measuring gauge of the generic type which ensures a high yield of ions in the rarefied gas by achieving high electron density with moderate requirements on the electron-emitting cathode. This object is achieved by the features in the characterizing clause of claim 1.

In a vacuum measuring gauge according to the invention a larger emitter area can be accommodated in a housing of a given size. An electrode configuration with a larger emitter area. As the emitter surface can be made large the required electron flow density at the same may be comparatively small such that moderate field strengths will usually be sufficient. This alleviates requirements on the cathode and allows for a wider choice of material and structure for the emitter surface.

In many cases relatively cheap, easy to manufacture solutions will become practical. The emitter area may be formed by an emitter layer on the surface of the housing wall or even by the wall surface itself in which case the vacuum measuring gauge is especially simple and mechanically stable.

Where the emitter area is concave and in part surrounds a reaction region containing the ion collector, the electrons emitted by the cathode will remain in the reaction region until they eventually reach the anode. They will repeatedly collide with molecules of the rarefied gas in the reaction region and thereby produce ions which can be used in the measuring process. Only a small fraction of the electrons will escape and reach the housing along a relatively short trajectory, even where no special measures, like keeping the housing at a voltage which is lower than the emitter voltage, are taken to prevent it. Even with a modest electron flow from the cathode, electron density in the reaction region will be high and a high yield of ions is assured.

The high achievable ion yield, together with the absence of side effects like desorption of gas molecules allow for extension of the measurement range to very low densities. At the same time, the required voltages are relatively small which allows the use of a rather simple and cheap control circuit with low power consumption.

BRIEF DESCRIPTION OF THE DRAWINGS

Below, the invention is explained in more detail with reference to figures which show only embodiments.

DESCRIPTION OF THE PREFERRED EMBODIMENTS

Figure 1:
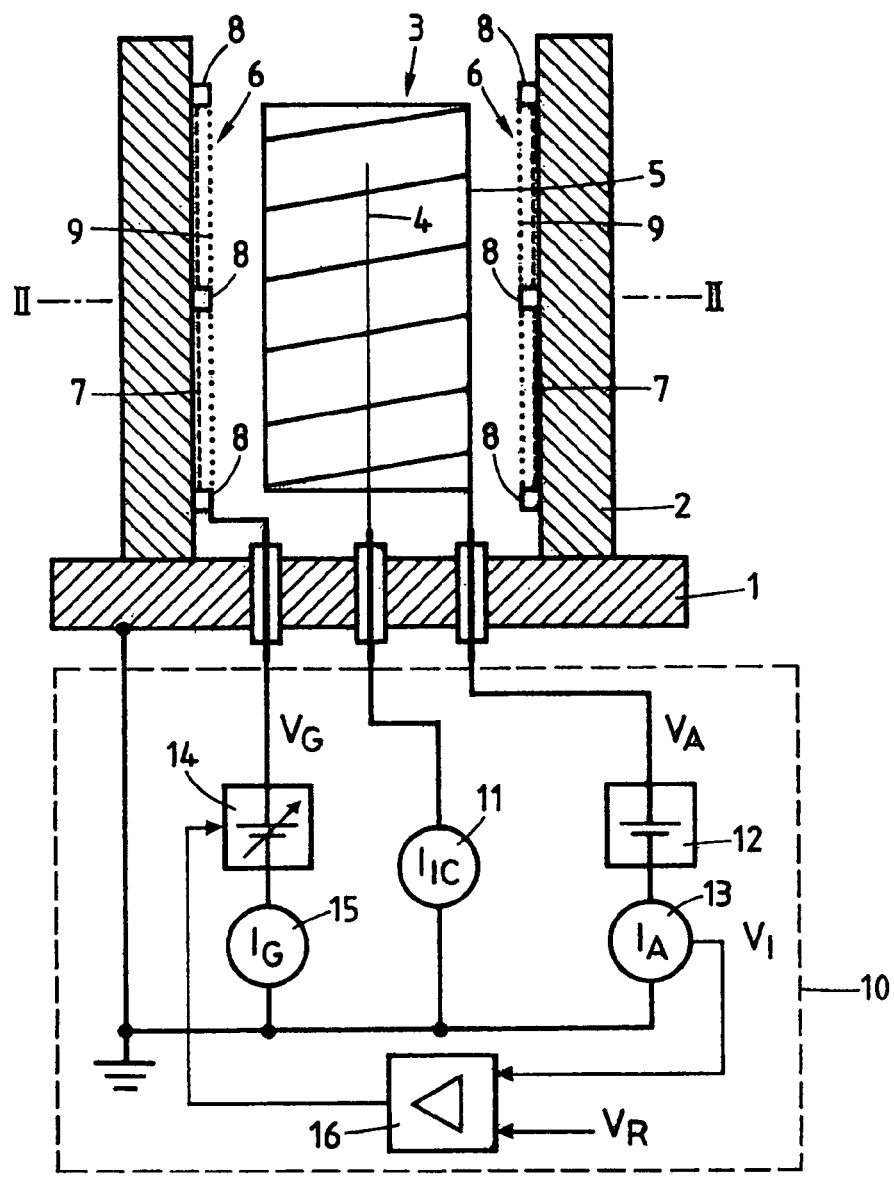
FIG. 1 shows an axial section through a first embodiment of a vacuum measuring gauge according to the invention.

The embodiment of the vacuum measuring gauge according to the invention of FIG. 1, 2 comprises a housing with a base plate 1 and a side wall 2 mounted on the base plate 1 which laterally encloses a cylindrical reaction region 3 which is open at the top so as to be connected with a vacuum chamber where the gas pressure is to be measured. The base plate 1 and the side wall 2 together form the housing. Preferably they consist each of an electrically conductive material, in particular stainless steel or aluminium. In the axis of the reaction region 3 an ion collector 4 in the shape of a straight thin axial filament or wire is arranged which is surrounded at a distance by an essentially cylindrical grid-like anode 5, e.g. a helix-shaped wire. The ion collector 4 and the anode 5 each consist of a metal or alloy, e.g., the ion collector 4 of tungsten or stainless steel and the anode 5 of tungsten, platinum iridium alloy or stainless steel. The diameter of the reaction region is preferably between 1 cm and 8 cm and in particular between 1 cm and 6 cm, its height between 2 cm and 8 cm and in particular between 2 cm and 5 cm.

The greater part of the side wall 2 serves at the same time as a support wall for an electron-emitting field emission cathode 6 which is attached to its interior surface and covers it virtually completely. The field emission cathode 6 provides an emitter area, a large concave surface of cylindrical shape which concentrically surrounds the ion collector 4 and the anode 5. Seen from the centre of the reaction region 3, that is, from a point on the axis, i.e., on the ion collector 4, at medium height, the emitter area covers about two thirds of the full solid angle of $4\pi$. The emitter area comprises an emitter surface formed by an emitter layer 7 of electrically conducting material which is attached to the side wall 2 and electrically connected to it and covers essentially the whole of the emitter area. Insulating spacers 8 are distributed over the emitter area, forming narrow strips which interrupt the emitter surface. The spacers 8 carry an electron-permeable gate 9 of electrically conducting material which is arranged at an essentially fixed distance in front of the emitter surface and electrically insulated from the emitter layer 7. The fixed distance may be anywhere between 1 µm and 5 mm, but preferably it is rather small, i.e., between 1 µm and 200 µm, in particular between 5 µm and 200 µm, e.g., approximately 10 µm. Preferably, the distance between the emitter surface and the ion collector 4 is at least 20 times the distance of the gate 9 from the emitter surface.

The ion collector 4, the anode 5, and the gate 9 are connected via insulating feedthroughs which may consist of glass or glass-ceramics in the base 1 to a control circuit 10 which is also electrically connected to the grounded housing and via the same to the emitter layer 7. The control circuit 10 is schematically shown to comprise a current meter 11 between the ion collector 4 and ground for measuring an ion collector current $I_{IC}$, a voltage source 12 which keeps the anode 5 at an anode voltage $V_A$ above ground voltage and is connected to ground via a current meter 13 measuring an anode current $I_A$ and representing it by an output voltage $V_I$, and a controllable voltage source 14 which provides a gate voltage $V_G$—somewhere between ground voltage and anode voltage $V_A$—at the gate 9 and is connected to ground via a current meter 15 measuring a gate current $I_G$. The controllable voltage source 14 is controlled by a regulator 16 which compares the output voltage $V_I$ of current meter 13 with a reference voltage $V_R$. It causes the gate voltage $V_G$ to be increased whenever the output voltage $V_I$ of the current meter 13 which represents the anode current $I_A$ falls below the reference voltage $V_R$ and vice versa. So the anode current $I_A$ which reflects the electron emission from the field emission cathode 6 is used as a control current for controlling the gate voltage $V_G$ and thereby the said electron emission. It is, within narrow limits, kept constant at a set value by appropriate control of the gate voltage $V_G$. Alternatively, the gate voltage $V_G$ can be pulsed.

The emitter layer 7 of the field emission cathode 6 can be realised in various ways. It can be an arrangement of carbon nanotubes, diamond-like carbon, a metal or a mixture of metals containing, e.g., molybdenum, tungsten or nickel or a semiconductor material, e.g., silicon which may be coated, e.g., with carbide or molybdenum. In any case the emitter surface should be rough with sharp edges or points where high local field strengths are achieved. Instead of cylindrical the shape of the emitter area can be prismatic or, at least in part, spherical. The emitter layer can be a thin layer applied using CVD or other known methods.

If the side wall 2 consists of metal, preferably stainless steel, it may, due to the large size of the emitter area, be sufficient to provide an adequate emitter surface simply by roughening the interior surface of the wall, either by mechanical means or, preferably, by etching, e.g., by plasma etching or, in particular, by chemical etching. A simple etching process will, even without masks or other structuring tools being used, produce a rough surface with sharp edges and tips where the electric field will attain local maxima which are elevated enough to cause a sufficient level of electron emission simply by bringing out the grain of the wall material.

It is, of course, possible to provide walls with surface portions covered by emitter areas which have other shapes, in particular, with generally curved, that is, non-planar emitter areas of, e.g., concave spherical or even corrugated or convex shape. Apart from the small scale surface roughness which is required by the desired electrical properties, the surface may, on a larger scale, be essentially smooth or it may be piecewise smooth or even piecewise planar with edges where the pieces meet. The overall configuration is preferred to be non-planar in order that the area of the emitter surface be enhanced as compared with that of an overall planar configuration. The emitter area may cover, e.g., between 0.5 cm$^2$ and 80 cm$^2$ and in particular between 1 cm$^2$ and 50 cm$^2$.

The gate 9 can be a wire mesh made of metal wires or a grid, also of metal, e.g., nickel, molybdenum or stainless steel as the metal ought to be sputter-resistant. Another possibility consists in providing a relatively dense array of equally distributed spacers which rise above the emitter surface by a distance corresponding to the desired distance between the same and the gate and where the surfaces facing away from the support wall are covered with patches of thin metal film which together form the gate. In this case the emitter area is divided into an intermittent emitter surface and a complementary gate surface, the electric field strength being largest at the boundaries. The spacers can, in particular in the latter case, also be applied by CVD or similar methods and the patches electrically connected to each other through the spacers by known semiconductor manufacturing methods and further to controllable voltage source 14.

Instead of isolated spacers other spacer means can be used like a porous spacer layer with a thickness of a few micrometers, e.g., a ceramic foil with microholes. The gate can then take the shape of a thin metal film covering the surface of the spacer layer.

In any case, due to the small distance between the emitter surface and the gate, even with a relatively small gate voltage $V_G$ which may be between 200 V and 1'000 V, preferably between 200 V and 600 V, e.g., 300 V a strong electric field is created at the emitter surface which, dependent on the type of gate used, can be relatively homogeneous or rather inhomogeneous. In any case, the high field strength at the emitter surface causes the extraction of electrons from the same which are further accelerated by the electric field between the field emission cathode 6 and the anode 5. The electrons collide with molecules of the rarefied gas in the reaction region 3, causing their ionisation.

The positive ions are attracted to the ion collector 4 where they take up electrons, thereby causing ion collector current $I_{IC}$ which is essentially proportional to the rate at which ions are produced. The electrons emitted by the cathode 6 as well as those produced in the ionisation process are ultimately attracted to the anode 5, causing anode current $I_A$. A fraction of the electrons extracted from the emitter surface is caught in the gate 9, causing gate current $I_G$. Another fraction of electrons may escape to the base plate 1 or the side wall 2. This effect does not influence the result of the measurement but may result in reduced efficiency of the ionisation process. However, due to the large size of the emitter area and with a solid angle covered by it of $2\pi$ or more, i.e., 50% or more of the total of $4\pi$, as seen from the central part of the reaction region 3, losses of this type are kept very small.

With the anode current $I_A$ kept constant, the ion collector current $I_{IC}$ is a measure of the density of gas molecules in the reaction region 3. It is, however, also possible to keep the cathode current or the gate current constant by appropriately regulating the gate voltage. The pressure measuring apparatus as described is suitable for measuring pressures in the range from $10^{-1}$ mbar to $10^{-13}$ mbar and in particular from $10^{-2}$ mbar to $10^{-11}$ mbar.

Figure 2:
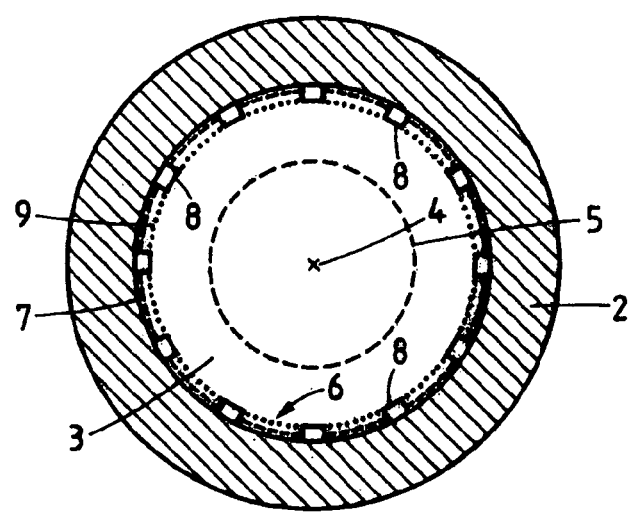
FIG. 2 shows a cross section through the vacuum measuring gauge along II-II in FIG. 1.
Figure 3:
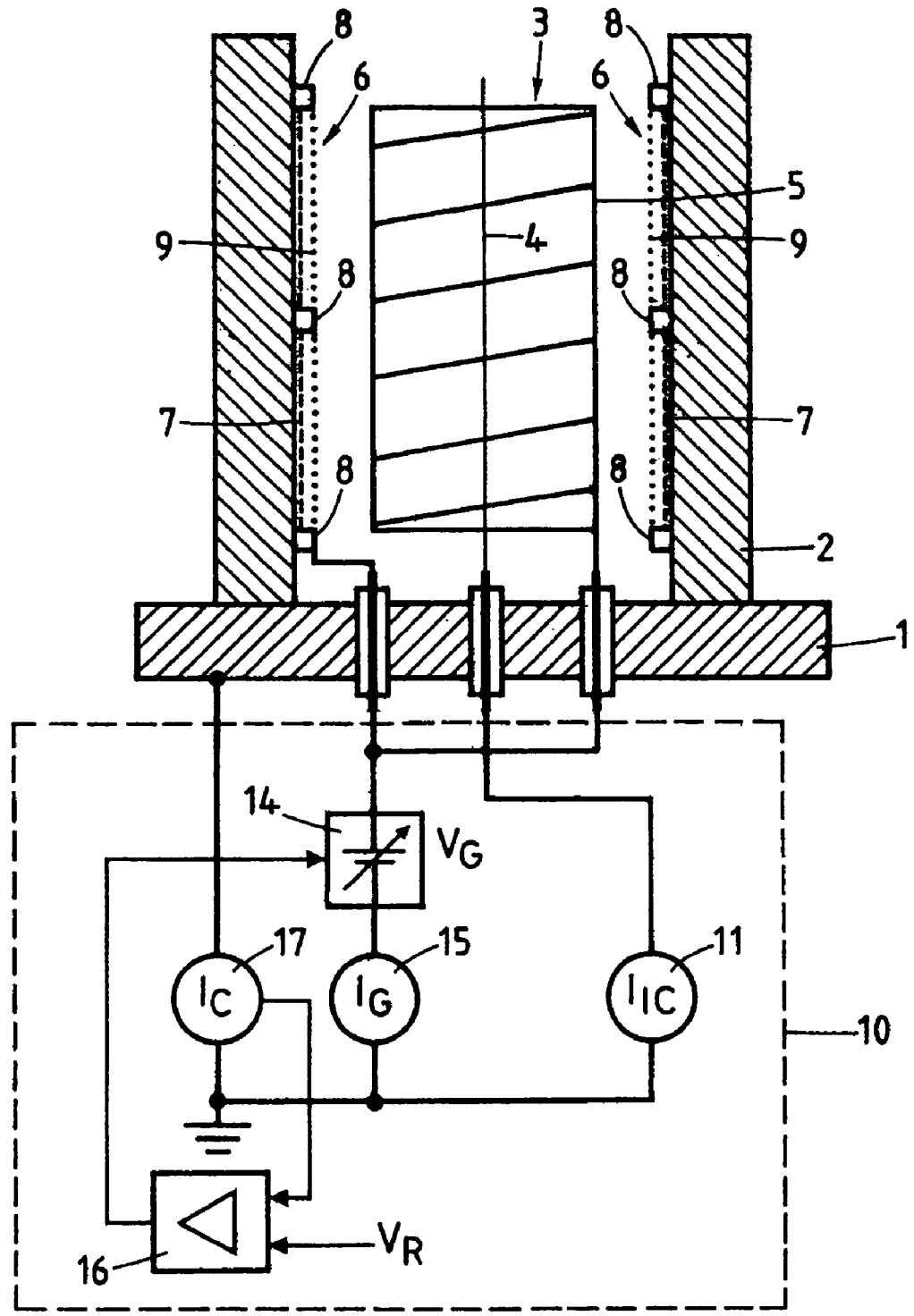
FIG. 3 shows an axial section through a second embodiment of a vacuum measuring gauge essentially like the configuration shown in FIGS. 1, 2, with a simplified control circuit.

The embodiment of the vacuum measuring gauge according to the invention shown in FIG. 3 is very similar to the one described above, only the control circuit 10 being somewhat simpler in that the anode voltage is not controlled separately and the anode current is not monitored. Corresponding parts are denoted by the same reference numerals and details may be found in the description of the pressure measuring apparatus according to FIGS. 1, 2.

The controllable voltage source 14 of control circuit 10 which produces the gate voltage $V_G$ is again controlled by a regulator 16 which here compares the output voltage of a current meter 17 measuring a cathode current $I_C$ from the housing which serves as a control current with fixed reference voltage $V_R$. The anode 5 is connected to controllable voltage source 14 in parallel with gate 9 and is therefore kept at the same voltage. The ion collector current $I_{IC}$ as measured by current meter 11 is again a measure of the density of gas molecules in the reaction region 3. Anode 5 serves to shape the electrical field in the reaction region 3 but it is not absolutely required. An electrode configuration without an anode will usually be adequate as well.

Figure 4:
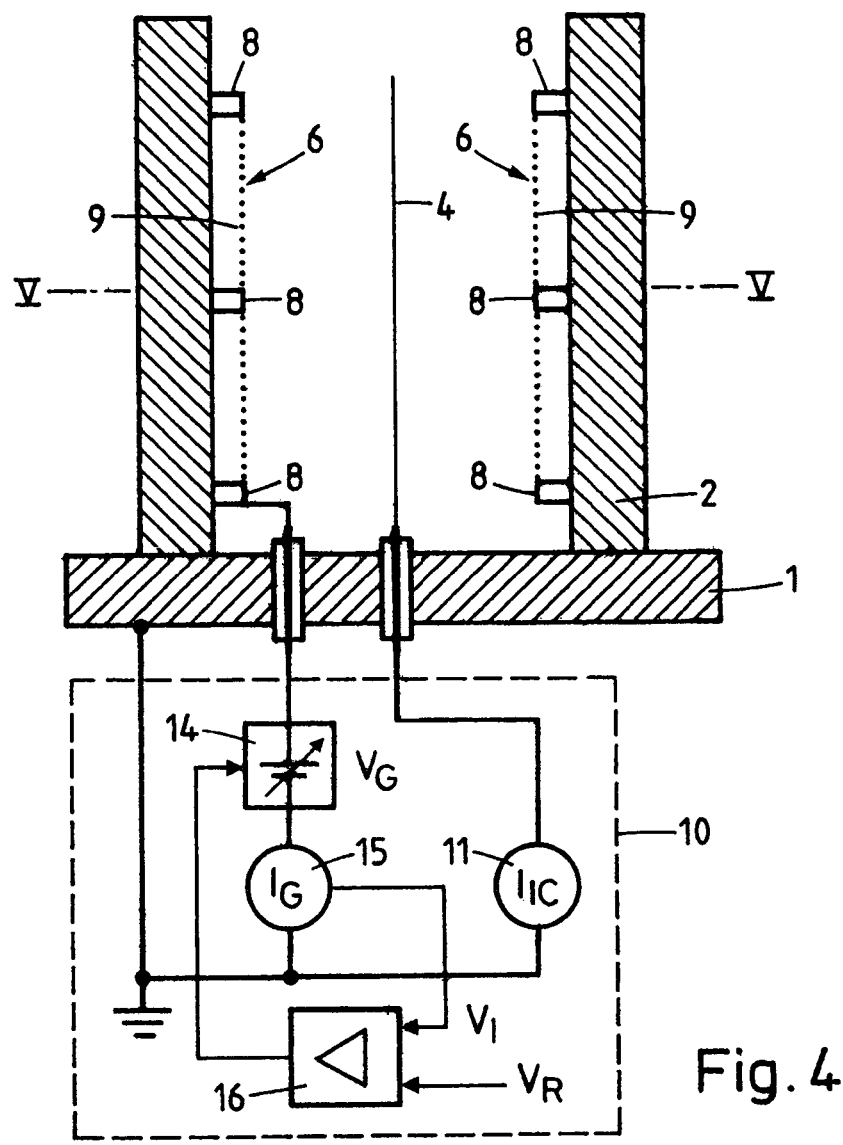
FIG. 4 shows an axial section through a third embodiment of a pressure measuring gauge according to the invention.
Figure 5:
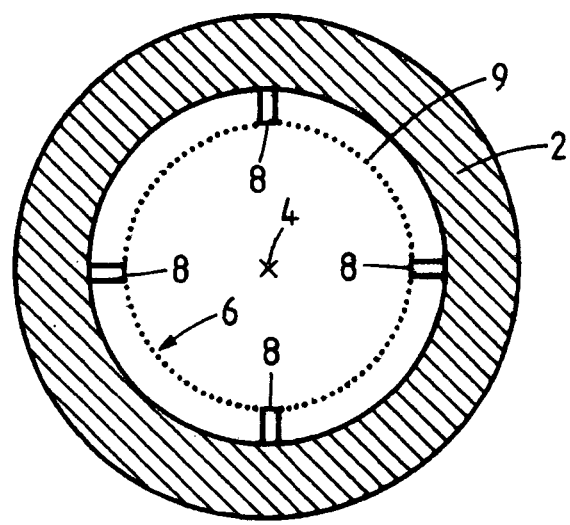
FIG. 5 shows a cross section through the vacuum measuring gauge along V-V in FIG. 4.

FIGS. 4, 5 show a particularly simple, robust and low-cost third embodiment of the vacuum measuring gauge according to the invention with just such a configuration. The control circuit 10 is similar to the one of the second embodiment but even simpler in that, apart from ion collector current $I_{IC}$ which is again a measure of the pressure in the reaction region 3, only the gate current $I_G$ is measured and used for controlling the gate voltage $V_G$. As a consequence, only two feedthroughs are present. The emitter surface is formed by a large portion of the inside surface of the side wall 2 which consists of stainless steel. The said surface portion has been roughened by chemical etching and is covered by the grid 8. Therefore no separate emitter layer is present.

LIST OF REFERENCE SYMBOLS 1 base plate
2 side wall
3 reaction region
4 ion collector
5 anode
6 cathode
7 emitter layer
8 spacer
9 gate
10 control circuit
11 current meter
12 voltage source
13 current meter
14 controllable voltage source
15 current meter
16 regulator
17 current meter
$I_A$ anode current
$I_C$ cathode current
$I_{IC}$ ion collector current
$I_G$ gate current
$V_A$ anode voltage
$V_G$ gate voltage
$V_I$ output voltage
$V_R$ reference voltage

The invention claimed is:

1. A vacuum measuring gauge, comprising:
a housing with a wall comprising electrically conductive material and forming an interior wall surface delimiting a reaction region,
a field emission cathode for emitting electrons into the reaction region, with an emitter area arranged at the wall surface which is at least intermittently taken up by an emitter surface,
an electrically conducting gate intermittently covering the emitter area, being electrically insulated from the emitter surface, and being supported by electrically insulating spacer means intermittently filling a gap between the emitter surface and the gate and spacing the gate from the emitter surface by a substantially constant gate distance in a direction normal to the emitter surface, as well as a feedthrough connected to the gate and leading through the housing to outside of the housing, and
an ion collector arranged inside the reaction region at a distance from the field emission cathode, as well as a feedthrough connected to the ion collector and leading through the housing to outside of the housing.

2. A vacuum measuring gauge according to claim 1 wherein a solid angle covered by the emitter area as seen from at least one point located on the ion collector is at least $2\pi$.

3. A vacuum measuring gauge according to claim 1 wherein the emitter area covers between 0.5 cm² and 80 cm².

4. A vacuum measuring gauge according to claim 1 wherein the minimum distance of the ion collector from the emitter surface is at least 20 times the gate distance.

5. A vacuum measuring gauge according to claim 1 wherein the emitter area is at least partially concave.

6. A vacuum measuring gauge according to claim 5 wherein the emitter area comprises at least a section of a concave cylindrical surface.

7. A vacuum measuring gauge according to claim 6 wherein the reaction region is substantially cylindrical, being laterally delimited by a substantially cylindrical portion of the wall surface which is at least partially taken up by the emitter area, while the ion collector is arranged in the vicinity of the axis of the reaction region.

8. A vacuum measuring gauge according to claim 7 wherein a diameter of the reaction region is between 1 cm and 8 cm and a height of the reaction region is between 2 cm and 8 cm.

9. A vacuum measuring gauge according to claim 7 wherein the emitter area covers the cylindrical portion of the wall surface substantially completely.

10. A vacuum measuring gauge according to claim 1 wherein the emitter surface is a front surface of an emitter layer consisting essentially of carbon nanotubes, diamond-like carbon, a metal or a mixture of metals or a semiconductor material.

11. A vacuum measuring gauge according to claim 10 wherein the emitter layer consists essentially of molybdenum or tungsten.

12. A vacuum measuring gauge according to claim 10 wherein the emitter layer is a thin layer deposited on the wall surface.

13. A vacuum measuring gauge according to claim 1 wherein the emitter surface is formed by at least part of the wall surface itself, with the wall comprising a metal or an alloy.

14. A vacuum measuring gauge according to claim 13 wherein the emitter surface is roughened.

15. A vacuum measuring gauge according to claim 1 wherein the gate distance is between 1 μm and 200 μm.

16. A vacuum measuring gauge according to claim 1 wherein the gate is a grid.

17. A vacuum measuring gauge according to claim 1 wherein the spacer means comprises electrically insulating spacers distributed over the emitter area.

18. A vacuum measuring gauge according to claim 17 wherein the gate comprises gate patches covering surfaces of the spacers.

19. A vacuum measuring gauge according to claim 1 wherein the spacer means comprise an electron-permeable layer covering the emitter surface and placed in front of the same.

20. A vacuum measuring gauge according to claim 1 further comprising an anode arranged between the ion collector and the gate, the anode being configured as a substantially cylindrical grid surrounding the ion collector.

21. A vacuum measuring gauge according to claim 1 wherein the ion collector is a straight electrically conducting element.

22. A vacuum measuring gauge according to claim 1 further comprising a control circuit arranged outside the housing, the control circuit being electrically conductively connected to at least the housing and, in each case via the feedthrough, to the gate and to the ion collector and being suitable for keeping the emitter surface at an emitter voltage, keeping the gate at a gate voltage above the emitter voltage, keeping the ion collector at a collector voltage which is essentially equal to the emitter voltage or lower, and monitoring a collector current from the ion collector.

23. A vacuum measuring gauge according to claim 22 wherein the control circuit is suitable for keeping the gate voltage above the emitter voltage by between 200V and 1,000V.

* * * * *